Feb. 27, 1968 J. E. FULENWIDER ET AL 3,371,328

MAGNETIC MEMORY EMPLOYING CROSS-FIELD INTERROGATION

Filed Jan. 30, 1964 4 Sheets-Sheet 1

INVENTORS.
JOHN E. FULENWIDER
BY HILARY M. WINTERS
C. A. Gulbrandsen
ATTY.

INVENTORS
JOHN E. FULENWIDER
HILARY M. WINTERS
BY Spencer E. Olson
ATTY.

INVENTORS.
JOHN E. FULENWIDER
HILARY M. WINTERS
BY C. A. Gulbrandsen
ATTY.

MAGNETIC MEMORY EMPLOYING CROSS-FIELD INTERROGATION

Filed Jan. 30, 1964 4 Sheets-Sheet 4

INVENTORS.
JOHN E. FULENWIDER
HILARY M. WINTERS
C. A. Gulbrandsen
ATTY.

United States Patent Office 3,371,328 Patented Feb. 27, 1968

3,371,328

MAGNETIC MEMORY EMPLOYING CROSS-FIELD INTERROGATION

John E. Fulenwider, Glenview, and Hilary M. Winters, Chicago, Ill., assignors to Automatic Electric Laboratories, Inc., Northlake, Ill., a corporation of Delaware Filed Jan. 30, 1964, Ser. No. 341,237
6 Claims. (Cl. 340—174)

ABSTRACT OF THE DISCLOSURE

The sense conductors of a core memory are displaced a predetermined distance from the axes of the cores to improve the signal to noise ratio when a transverse interrogation field is applied. The displacement of sense conductors is provided by utilizing a core array in which the cores associated with the same sense conductor are staggered with respect to each other. In a two-core-per-bit memory plane, a similar configuration employs noise to enhance rather than degrade the output signal.

This invention relates to magnetic memories and in particular to magnetic core memories in which interrogation is accomplished by employing transverse or quadrature magnetic fields.

It is well known to use magnetic cores to store information in binary form utilizing the two remanent flux states of the core. One of the problems associated with magnetic memories is that of being able to extract this information from the memory in a form that is suitable to be correctly recognized, and subsequently, correctly utilized. Included in the problem of information extraction is the quality of the binary output signals. For example, an information signal should not be degraded by noise that is generated in the memory. Furthermore, the output signals should be of such a polarity and magnitude as to be easily distinguished by the memory sensing apparatus.

R. M. Tillman, in his article "Flux Lock—A Nondestructive, Random-Access Electrically Alterable, High-Speed Memory Technique Using Standard Ferrite Memory Cores," published in the September 1960 issue of the IRE Transactions on Electronic Computers, describes a core memory in which information is extracted from the cores by the application of an orthogonal magnetic field. The sense windings are threaded through each core twice, in a transposed manner, to provide cancellation of common mode noise. In memories of this type it is a usual practice to thread the sense windings through the aperture in such a manner that it passes through somewhat near the axis of each core parallel to the direction of the transverse field; therefore, bipolar signals of equal amplitude will be generated regardless of the direction of flux switching. An asymmetrical output results, as will be explained in greater detail below, when the sensing conductor happens to be displaced from the axis of the core, for example due to inaccuracies in threading. It is difficult to place the sense wire precisely through the core axis, thus the wire will wander to either side in an unpredictable manner through a core matrix resulting in poor quality output signals. Such an uncontrolled displacement pattern in a core memory will cause the resulting information signal to be clouded with noise and of little or no value. The amount of displacement required to create this undesirable situation varies with the size of the core employed.

It is an object of the invention to provide a new and improved magnetic memory.

It is another object of the invention to provide an improved magnetic memory from which greater than normal magnitude information signals are obtained substantially free of noise.

Accordingly, the present invention makes use of a heretofore undesirable displacement of the sense conductors. In accordance with the invention, this displacement is made in a predetermined pattern to introduce noise into the memory from each interrogated core to enhance the output signals. Additionally, two magnetic cores are employed for each bit of information storage to provide symmetrical or asymmetrical output signals that are substantially free of noise and of greater than normal magnitude. The particular configuration resulting from the above actually converts noise into signal as will be explained in greater detail below.

Other objects and features of the invention not specifically set forth will become apparent and the invention will best be understood from the following description taken in conjunction with the accompanying drawings.

Figure 1:
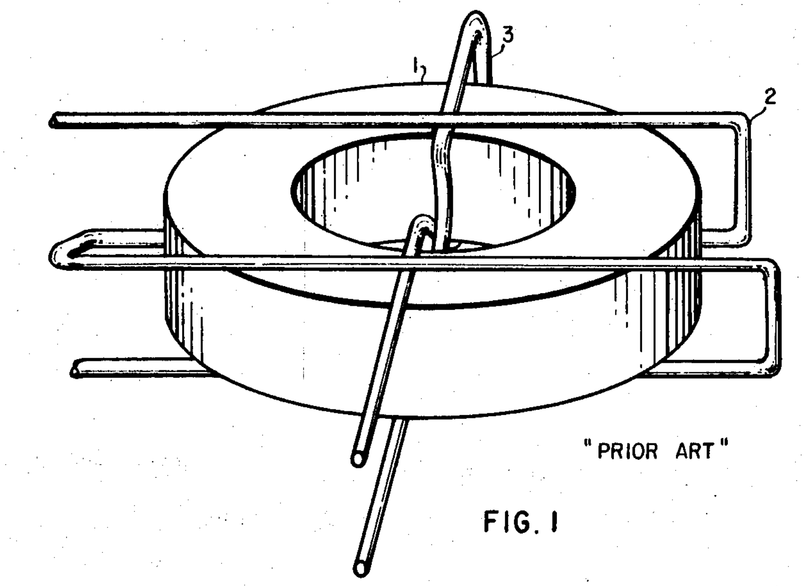
FIG. 1 is a pictorial representation of a prior art magnetic core adapted for operation in the flux rotation mode.

Referring to FIG. 1, a magnetic core 1 is shown having a solenoid 2 and a sense conductor 3. The solenoid 2 is wrapped around the entire core to produce the transverse, quadrature, or as hereinafter designated, cross field by the easiest means of fabrication.

Figure 2A:
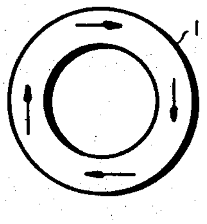
FIGS. 2A and 2B are schematic representations of the flux rotation mode.
Figure 2B:
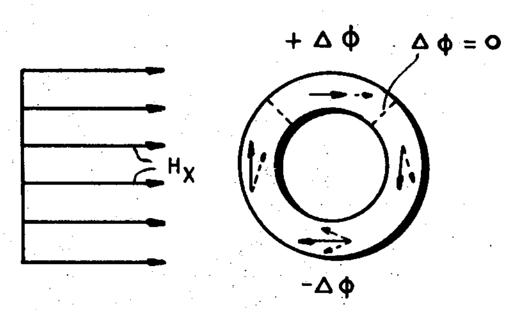

Referring to FIGS. 2A and 2B, FIG. 2A shows the core 1 with its remanent flux state, designated by the arrows showing domain alignment, oriented in a clockwise direction before interrogation. When the cross field $H_X$ is applied, the flux is altered as shown in FIG. 2B. In the top portion of the core, the remanent flux is in the same direction as the interrogating field $H_X$. The individual domains which have their magnetization vector in some direction other than the vector representing the magnetization of the core, are forced into alignment. The result is an increase in the net magnetization vector in this region. This is shown as a flux change gradient around the periphery of the core from $+\Delta\phi$ at the top to $-\Delta\phi$ at the bottom. The remanent flux in the lowest portion of the core is directly opposed to the applied interrogating field and the flux is altered in such a manner that the net magnetization vector is shortened and the flux change is thus shown as $-\Delta\phi$. The balance of the core will undergo flux alteration following the above mentioned gradation. The location of zero flux change however is arbitrarily designated by the dashed lines since its exact location is not necessarily as shown.

The seeming anomaly resulting from the unequal flux distribution through the core during interrogation is theorized as follows.

The remanent flux in one portion of the core preserves its continuity around the core. In the remainder of the core the excess of flux over this minimum value completes its continuity through an air path around the solenoid conductor 2 which establishes the cross field $H_X$. Thus, the basic premise of flux continuity is satisfied.

Figures 3, 4, 5, 6:
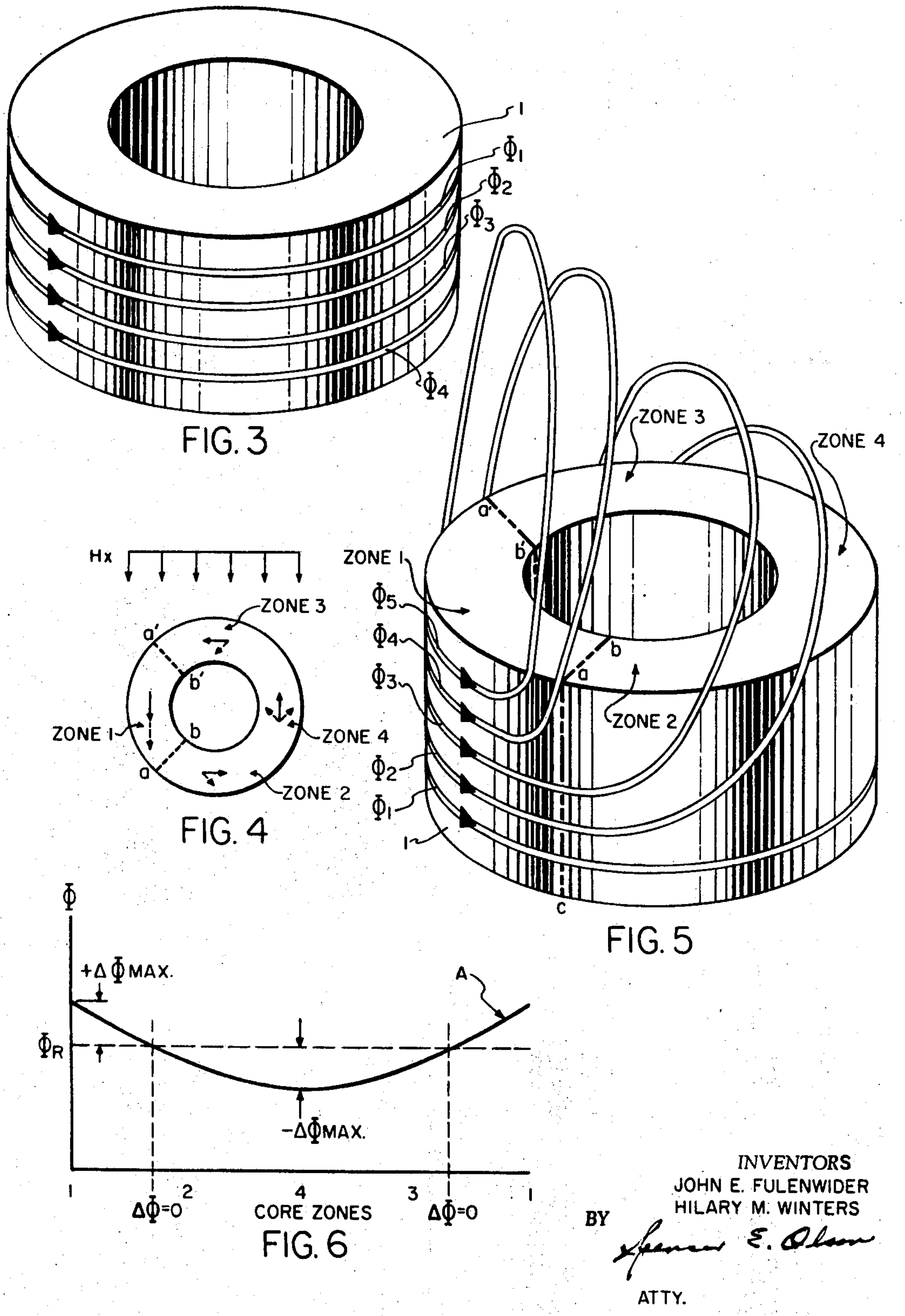
FIG. 3 is a pictorial view of a core wherein lines of flux are shown to symbolize one remanent state of the core as illustrated by the vectors of FIG. 2A.
FIGS. 4 and 5 are illustrations similar to FIG. 2B showing by vectors and flux lines, respectively, a disturbance of the remanent state due to the application of a transverse field.
FIG. 6 is a graphical illustration of the flux change gradients of a core due to the application of a transverse field.

The reader will better understand the above theory by referring to FIGS. 3–6. FIG. 3 illustrates the state of remanent flux in the core 1 when a cross field is not present. Flux lines $\phi_1$–$\phi_4$, shown only on the surface of the core for clarity, represent the remanent flux.

FIG. 4 shows the core divided into four general zones, ZONE 1–ZONE 4 when the cross field $H_X$ is applied as in FIG. 2B. The pictorial representation of FIG. 5 amplifies on FIG. 4 and shows how the flux lines $\phi_1$–$\phi_4$ are affected with respect to ZONES 1–4 as the field $H_X$ is applied. In addition to the remanent flux, a new flux line $\phi_5$ is shown to represent flux added due to the application of the cross field. The influence of the pulsed field $H_X$, as shown by the flux pattern of FIG. 5, can be summarized as follows: ZONE 1 experiences a magnetizing field that is in the direction of remanent flux and is driven further into saturation by the additional flux $\phi_5$; ZONE 4 is partially demagnetized since field $H_X$ is opposed to the remanent flux in that zone due to the absence of lines $\phi_1$–$\phi_3$ in that zone; when field $H_X$ is applied a flux change gradient is evident between ZONES 1 and 4; at some regions (planes *c–a–b, a'–b'*) between ZONES 1 and 2 and between ZONES 1 and 3 the flux condition is substantially the same as before the application of the field, hence in these regions $\Delta\phi$ is essentially zero; and flux continuity is preserved through the core and through the air around the solenoid.

The foregoing is graphically illustrated in FIG. 6 wherein $\phi_R$ represents the remanent flux ($\phi_1$–$\phi_4$) before the application of the cross field. A flux change gradient is shown by line A which passes from $\phi=\phi_R+\Delta\phi_{MAX}$ to $\phi=\phi_R-\Delta\phi_{MAX}$ and back to $\phi=\phi_R+\Delta\phi_{MAX}$ through two points where $\phi=\phi_R$ or $\Delta\phi=0$.

If in FIG. 2B the remanent flux state of the core is reversed, the top and bottom of the core exchange roles with $-\Delta\phi$ now appearing at the top and $+\Delta\phi$ appearing at the bottom. Flux change in the remaining sections of the core is analogous to that of the previous state with due regard being made to the reversed net magnetization vector.

Assuming for example, that signal voltages are generated by those flux changes which are in the direction to shorten the net magnetization vector, regions having a flux change of $-\Delta\phi$, then noise voltages are generated by flux changes which tend to increase the net magnetization vector, namely $+\Delta\phi$. If a sense conductor 3 is threaded through the aperture of the core in such a manner that it passes through the axis of the core, and is also parallel to the direction of the cross field, signals of equal amplitude will be generated regardless of the direction of the remanent flux. However, if the sense conductor is displaced to either side of the core axis, an asymmetrical output results.

Figure 7A:
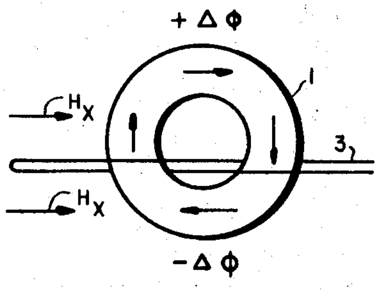
FIGS. 7A and 7B are schematic representations showing opposite displacements of the sense conductors.
Figure 7B:
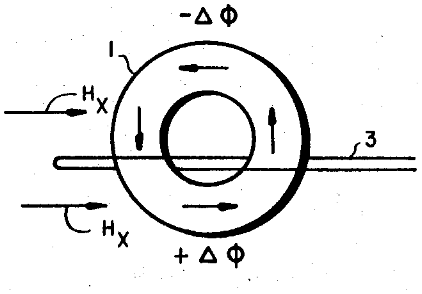

Referring to FIG. 7*a*, the sense conductor 3 is displaced toward the portion of the core 1 that is undergoing a negative flux change. Sense conductor 3 therefore intercepts a greater magnitude of flux change than it would if it were to intersect the core axis. The result is that the output signal is greater than normal. In FIG. 7B, the remanent flux state of the core 1 is reversed. In this instance the sense conductor 3 is displaced toward the portion of the core 1 that is undergoing a positive flux change. The sense conductor 3 now intercepts a lesser magnitude of flux change than normal and the resulting output voltage is less. If the sense conductor 3 is displaced sufficiently, the flux change that is intercepted could be reduced to zero, or even be reversed in direction. Such has been determined experimentally by successively sampling the state of a core and moving a sense wire through the points where $\Delta\phi$ is substantially equal to zero. In the latter case however, the polarity of the signal would be the same as in the previous case although reduced in magnitude.

The amount of sense conductor displacement required to create this heretofore undesirable situation varies with the diameter of the core employed; however, it is not very great. Since it is very difficult to place the sense wire precisely through the core axis, it is the random wandering of the wire to either side of the core axis in an unpredictable manner which caused the very noisy operation of memories heretofore employing the flux rotation technique.

The present invention deliberately introduces noise into the memory system. However, the noise is controlled to the extent that it is always of the same polarity and it is held to a moderate amplitude range. The injected noise acts to enhance one polarity of the output signals and degrades the opposite polarity. This is accomplished by offsetting or displacing the sense conductor 3 always in the same direction with respect to the interrogating field. With proper packaging techniques this is most easily done by staggering the cores associated with each sensing conductor and threading the cores in substantially straight lines.

Figure 8:
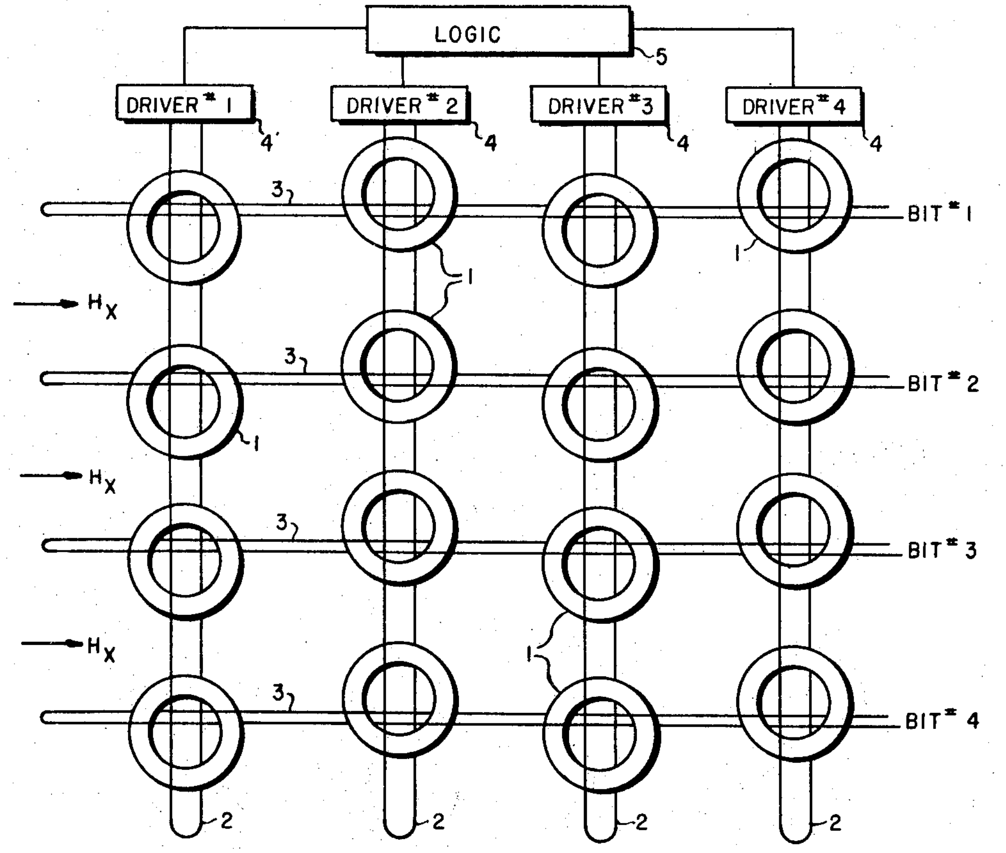
FIG. 8 is a schematic representation of a four-by-four core magnetic memory employing displaced sense conductors.

FIG. 8 shows a four by four memory matrix utilizing staggered cores to effect a displacement in the sense conductors 3. The solenoid windings 2 for reading a word are only schematically shown as single loop windings. However, reference in this respect can be made to FIG. 1 and to the above-mentioned Tillman article. The sense conductors 3 traverse the cores 1 in essentially straight lines. The system logic 5 controls the pulse sources 4 to selectively read from the memory. Of course some suitable sense amplifiers and information utilization apparatus are connected to the sense conductors 3.

The memory matrix shown in FIG. 8 will provide asymmetrical outputs for the two remanent flux states of each core. Although the asymmetry is consistent, this matrix configuration provides a small ONE to ZERO ratio.

Figure 9:
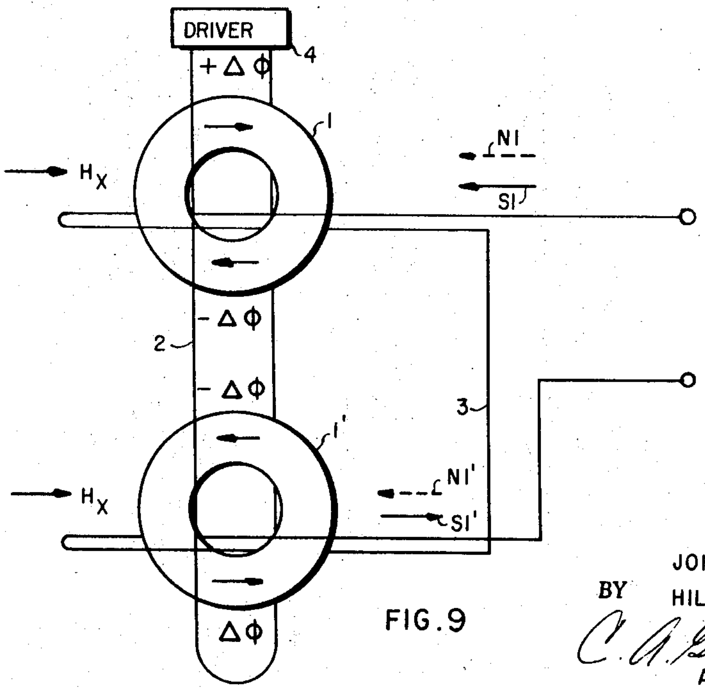
FIG. 9 is a schematic representation of a two-core-per-bit magnetic memory cell employing displaced sense conductors and noise injection.

Referring to FIG. 9, the offset sensing conductor is employed in a two-core-per-bit memory cell configuration which provides bipolar outputs with substantially no noise. In FIG. 9 the sense conductor 3 is threaded through the cores in an opposite winding sense. Since this conductor is also normally used to write information into the cores (the writing apparatus not shown), the two cores of each memory cell will be set in opposite flux state with respect to the cross field established by the interrogation pulse. As the interrogation pulse is applied to the solenoid winding 2 from the pulse source 4 it is easy to see from the above discussion that two signals are generated, one from increasing the net magnetization vector (noise) in one part of each core and another from decreasing the net magnetization vector (signal) in another part of each core. In FIG. 9 the two cores are referenced 1 and 1' and correspondingly the resulting output voltage components from noise and signal flux changes are referenced N1, N1' and S1, S1', respectively. It is seen that the two resulting noise signals are in opposite directions and tend to cancel. By employing the offset sense conductor technique excellent noise cancellation is obtainable. Imperfect cancellation occurs when the displacement of the sense conductors 3 varies widely between the two cores 1 comprising an information bit. Under these circumstances the output of the two remanent states becomes asymmetrical; however, no degradation of the output signal occurs, it is bipolar and of good quality.

Figures 10, 11A, 11B:
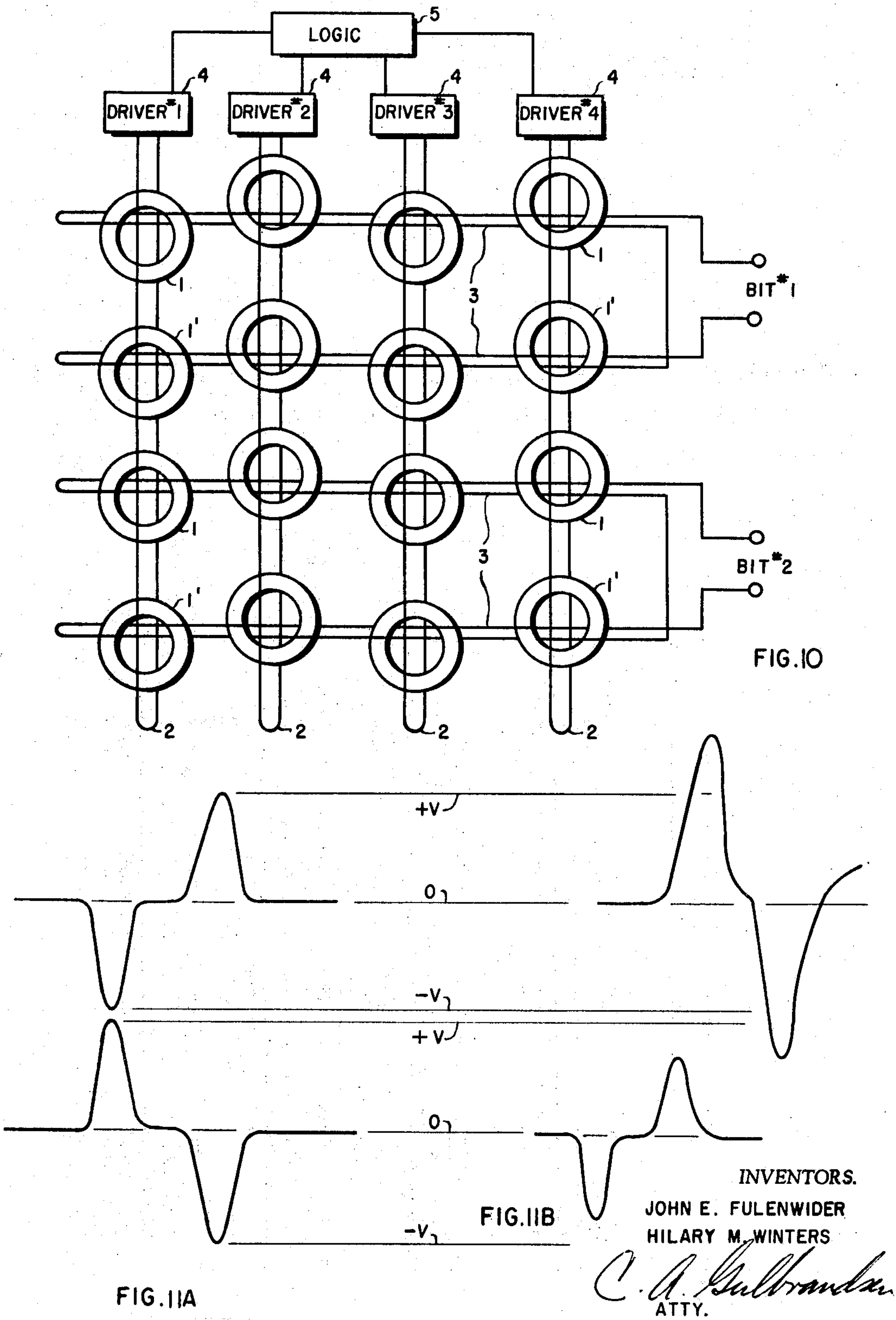
FIG. 10 is a schematic representation of a four-by-two magnetic memory employing displaced sense conductors and two-core-per-bit memory cells.
FIGS. 11A and 11B show symmetrical and asymmetrical output characteristics resulting from comparable displacement of the sense conductors and wide variation in the displacement of the sense conductors, respectively.

A two-core-per-bit configuration is employed in the memory matrix of FIG. 10. This matrix is somewhat similar to that of FIG. 8, that is it employs staggered cores. However, the configuration of FIG. 10 is preferred since better output signals are obtainable therefrom. In FIG. 10 as in FIG. 8 the logic apparatus 5 of the system with which the memory is associated selectively controls the pulse sources 4 to read particular words from the memory. Each sense conductor 3 would of course be connected to a read out amplifier which in turn is connected to apparatus for utilizing information stored in the memory.

A particular arrangement of this memory employed General Ceramics MC-151 cores having an outside diameter of 0.08 inch. The sense conductors were offset 0.01 inch; however, displacements as great as 0.025 inch were found to provide excellent results.

Many changes and modifications may be made by those skilled in the art without departing from the spirit and scope of the invention and should be included in the appended claims.

What is claimed is:

1. A magnetic memory cell comprising:

(a) first and second magnetic cores, said first core conditioned to a first remanent state characterized by a first direction of flux and said second core conditioned to a second remanent state characterized by an opposite direction of flux;

(b) first conductor means inductively coupled to said first and second cores for providing said cores with a cross field of magnetization to establish flux changes of opposite direction in corresponding portions of said cores;

(c) means for energizing said first conductor means to provide said cross field of magnetization;

and (d) second conductor means displaced a predetermined distance from the axes of said first and second cores in the same direction with respect to said cross field, said second conductor means being inductively linked to said first and second cores for sensing said flux changes as an output voltage.

2. The memory cell according to claim 1, wherein said second conductor means is equidistantly displaced from the axes of said first and second cores to provide symmetrical output signals.

3. The magnetic memory cell according to claim 1, wherein said second conductor means is displaced from the axes of said first and second cores to provide asymmetrical output signals.

4. A magnetic memory comprising:

(a) a plurality of magnetic core pairs, said core pairs being arranged in columns and in rows, a first core of each said pair conditioned to a first remanent state characterized by a first direction of flux and a second core of each said pair conditioned to a second remanent state characterized by an opposite direction of flux;

(b) a plurality of first conductor means each inductively coupled to separate ones of said columns of core pairs for providing a magnetic cross field to the associated core pairs to establish flux changes of opposite directions in corresponding portions of each core thereof;

(c) means for selectively energizing said plurality of first conductor means to provide said magnetic cross fields;

and (d) a plurality of second conductor means each inductively linked to separate ones of said rows of core pairs for sensing said flux changes as output voltages, said cores being arranged in a staggered pattern with respect to their respective second conductor means, and each said second conductor means extending through its row of cores in a straight line and displaced from the axes of each core pair in the same direction and from the axes of adjacent core pairs in the opposite direction.

5. The memory according to claim 4, wherein each said second conductor means is equidistantly displaced from the axis of each core of its associated row to provide symmetrical output voltages.

6. The memory according to claim 4, wherein each said second conductor means is displaced a first predetermined amount from the axis of each said first core in its associated row and is displaced a second predetermined amount from the axis of each said second core in its associated row to provide asymmetrical output voltages.

References Cited

Tillman, R. M.: "Fluxlok—A Nondestructive Random Access Electrically Alterable, High-Speed Memory Technique Using Standared Ferrite Memory Cores," IRE Transactions on Electronic Computers, September 1960, pp. 323–328.

BERNARD KONICK, *Primary Examiner.*

JAMES W. MOFFITT, *Examiner.*

R. MORGANSTERN, S. URYNOWICZ, *Assistant Examiners.*